(12) United States Patent
Srivastava

(10) Patent No.: US 7,797,188 B2
(45) Date of Patent: Sep. 14, 2010

(54) METHOD AND SYSTEM FOR OPTIMIZING BUSINESS LOCATION SELECTION

(75) Inventor: Ashok N. Srivastava, Mountain View, CA (US)

(73) Assignee: Saama Technologies, Inc., Campbell, CA (US)

( * ) Notice: Subject to any disclaimer, the term of this patent is extended or adjusted under 35 U.S.C. 154(b) by 828 days.

(21) Appl. No.: 11/710,093

(22) Filed: Feb. 23, 2007

(65) Prior Publication Data

US 2008/0205768 A1    Aug. 28, 2008

(51) Int. Cl.
  *G06F 17/00*    (2006.01)
(52) U.S. Cl. ...................................................... 705/10
(58) Field of Classification Search .................... 705/10
  See application file for complete search history.

(56) References Cited

U.S. PATENT DOCUMENTS

2002/0152092 A1 * 10/2002 Bibas et al. ..................... 705/1

2003/0018584 A1   1/2003  Cohen et al.
2003/0020739 A1   1/2003  Cohen et al.

OTHER PUBLICATIONS

Giovis, Jaclyn; Finding your place; Jun. 19, 2006; Knight-Ridder Tribune Business News—Sun-Sentinel-Fort Laude; dialog copy.*
http://www.zillow.com/search/Search.htm?addrstrthood=&citystatezip=94044&GOButton=%3CSPAN%3EGO%3C%2FSPAN%3E Sep. 18, 2007, p. 1.
http://www.zillow.com/HomeDetails.htm?zprop=15501677   Sep. 18, 2007, p. 2

* cited by examiner

*Primary Examiner*—Thomas Dixon
(74) *Attorney, Agent, or Firm*—Kevin H. Fortin

(57) ABSTRACT

A method and system for making predictions about business locations. The method includes providing a spatial map and analyzing heterogeneous data having a spatial component to find utilizable data. Relationships are automatically extracted from the utilizable data. The step of automatically extracting relationships includes generating a composite indicator, which correlates spatial data with unstructured data. The extracted relationships are presented on a spatial map to make a prediction about at least one business location. Preferably, the predictions are presented as a rank-ordered list on the spatial map and a heat map overlays the spatial map to indicate predictions about particular regions.

14 Claims, 5 Drawing Sheets

METHOD AND SYSTEM FOR OPTIMIZING BUSINESS LOCATION SELECTION

FIELD OF THE INVENTION

The present invention pertains to systems and methods for making predictions about business locations.

BACKGROUND OF THE INVENTION

Choosing an optimal location may be a critical issue for numerous businesses including businesses involved in retail, manufacturing, franchising, and housing. Numerous factors may contribute to the choice of the eventual location of a business location. These factors include, traffic flow, parking, real estate availability, cost, appearance, customer demographics, location of competitors, location of anchor businesses (i.e., businesses that attract customers that would be suitable for one's own business), barriers to traffic flow, and zoning. Currently, most companies use human insight and experience to combine these heterogeneous factors into a prediction regarding optimal business locations. Tables, spreadsheets, and experts are typically used to support the determination. However, even sophisticated retailers and fast-food companies may find that business location selection remains primarily a human endeavor.

There are a number of drawbacks to relying on traditional methods of business location selection. First, some businesses desire to have a clearly an articulated method to select their numerous business locations. The method is ideally applied uniformly so that methodology errors can be uniformly corrected.

Second, even with carefully articulated methods, human bias can introduce uncertainty and problems surrounding location selection. Biased, in this sense, means decisions are based in some measure on individual opinion and perception instead of actual data.

Third, since volumes of data is available, the process of analyzing data and choosing optimal locations based on the available data can be arduous and time consuming, which limits a decision-maker's ability to choose numerous optimal business locations within a short period.

Fourth, even where useful information is analyzed, it must be conveyed to a decision-maker. Sometimes the conclusions resulting from human efforts to analyze heterogeneous data is presented in a format where relationships between various pieces of data can be missed, resulting in less than optimal decision making.

A web site hosted at by Zillow, Inc. uses a spatial grid with an overlying heat map to present residential housing values. This presents home value data to a user in a simple and easily understood way. Varied colors indicate the average value for regions having a same color. Particular locations under investigation may be indicated with an icon. Clicking on the icon divulges more detailed information about the particular location. Real estate experts as well as casual information seekers can use this site. Although a wealth of data is presented in a user-friendly format, the data does not make any predictions.

A better way of choosing business locations is desired. Particularly, a way of choosing business locations, which is fast, utilizes numerous heterogeneous data sources, and consistently facilitates the making of useful business location choices is desired. It is also desired to have a decision support system that helps people select and otherwise make decisions about particular business locations. It is further desired to have a system that is easy to use.

SUMMARY OF THE INVENTION

The present invention solves several problems to enable people to make good business location decisions by utilizing available data. Normally the resolution and quality of the data can be problematic. Heterogeneity of data sources may also be a problem. Heterogeneity in this context, refers to the use of structured data (e.g. in the form of tables), unstructured data (e.g. in the form of free-text narratives), semi-structured data, and spatial data. Whereas a considerable technology exists to analyze data from any of the first three categories above, there are no known systems combine all four types of data and make predictions about optimal business locations in a spatial environment.

One aspect of the invention automatically identifies and combines heterogeneous data sources to provide a rank-order list of possible locations in a spatial region. Another aspect of the invention utilizes composite indicators, which are complex mathematical functions of the original input data. The composite indicators may be a function of input data having any of a number of heterogeneous forms. An additional aspect of the invention includes utilization of sophisticated methods for analyzing the performance of the models. Appropriate dimensionality reduction techniques are also an aspect of the invention.

The methods and system of the present invention enable the presentation of complex data in a useful and user-friendly form to enable predicting something about a business location. In particular, the present invention includes a method including steps of analyzing heterogeneous data sources to find utilizable data, extracting composite from the utilizable data, and using the composite indicators to make a prediction about at least one business location. Preferably the prediction is made and then presented on a heat map. The heat map may overlay, or be included within, a spatial map, grid or other spatial representation.

Machine learning and human input enables the automatic generation of the composite indicators that are most useful for making predictions. These composite indicators are complex mathematical functions of the original input data and are relied upon for optimal location decision-making. Appropriate dimensionality reduction techniques are also described to reduce the time and computing resources required for analyzing large amounts of data. Composite indicators can also be pre-selected.

A method of the present invention includes providing a spatial map, analyzing heterogeneous data having a spatial component to find utilizable data, automatically extracting relationships from the utilizable data and using the extracted relationships to make a prediction about at least one business location on the spatial map.

The prediction is displayed in the form of a rank-ordered list on the spatial map, on a heat map, or on a spatial map including a heat map. The heat-map includes polygons of various colors on the spatial map to indicate optimal regions for business location. Ideally the spatial map includes a grid to effectuate identification of locations, regions and the display of predictions.

The step of automatically extracting relationships includes generating a composite indicator. The composite indicator correlates unstructured data with semi-structured data, structured data or any combination of these types of data. The composite indicator may specifically correlate spatial data with other data of any format. Preferably composite indicators most relevant to a desired prediction is leaned from the data. A typical composite indicator would relate demographic variables, competitor proximity, accessibility, product mix, or comparable customer spending patterns with spatial data. The predictions can be shown on a map using a variety of smoothing methods, including Parzen windows, kernel smoothers, averaging, and other more complex methods.

The step of analyzing includes creating a data matrix having a particular dimensionality and the method further comprises the step of reducing the dimensionality of the data matrix to ease mathematical complexity. Numerous ways exist to reduce the dimensionality problem. One includes assigning relevancy scores to the data, selecting meaningful data based on the relevancy score and utilizing only the meaningful data.

While the present invention is directed to making predictions about business locations, it particularly useful for predicting optimal retail locations. Also, the term "business" should be broadly construed to include churches, hospitals, real estate investments, restaurants, schools, entertainment, fitness and sports facilitates, and other for-profit and non-profit business. Additionally, the field of data mining is able to provide numerous solutions to analyzing data, so the techniques described herein should be construed to include a variety of ways to analyze the data and to utilize machine learning.

BRIEF DESCRIPTION OF DRAWINGS

The invention may be better understood with reference to the detailed description in conjunction with the following figures where like numerals denote like elements, and in which.

DETAILED DESCRIPTION

Figure 1:
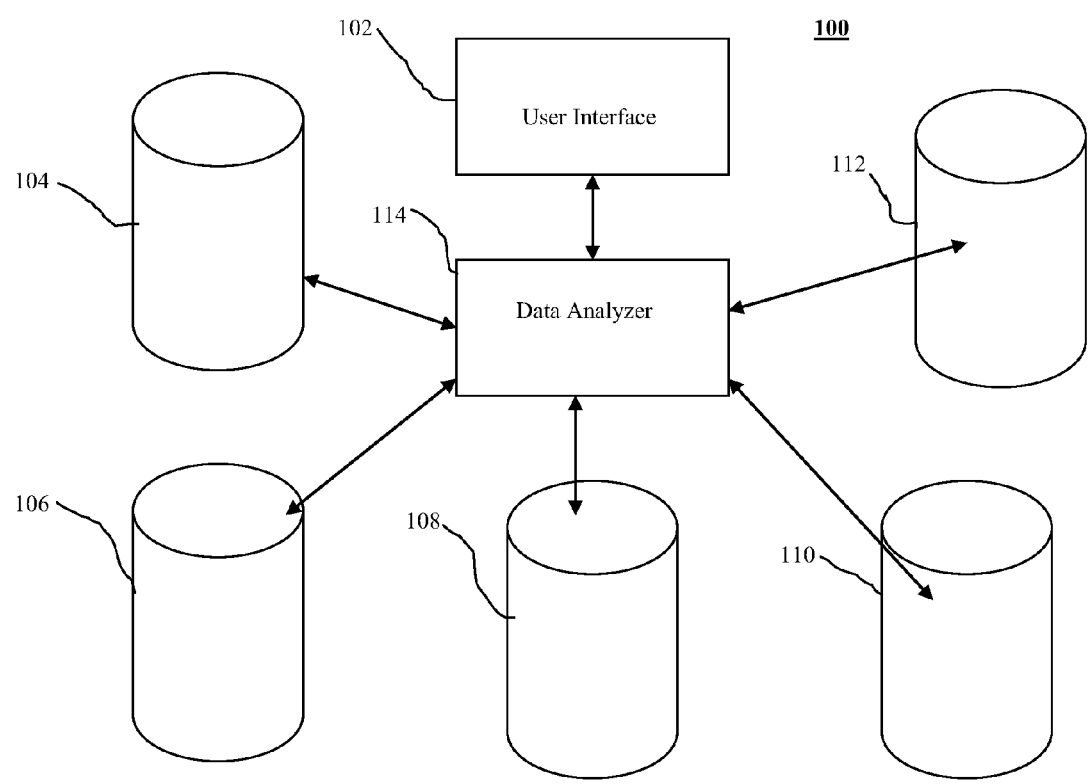
FIG. 1 is a system in accordance with the present invention.

FIG. 1 is a system 100 for optimizing business location selection. The system includes a user interface 102, heterogeneous databases 104, 106, 108, 110, and 112 and a data analyzer 114. The databases hold structured data, unstructured data, semi-structured data and spatial data.

The data analyzer 114 includes a computer with programmed with software, which enables communication with the databases 104, 106, 108, 110, and 112 to analyze data integrity and data quality. The databases 104, 106, 108, 110, and 112, and the data contained therein are analyzed to find utilizable data. The analyzer 114, which includes a computer programmed with software, automatically extracts relationships from the utilizable data.

According to one aspect of the invention the system 100 includes a networked computing environment, which communicates with the various database 104, 106, 108, 110, and 112, and other databases and computing resources. The network may include a local network, a virtual private network, or a public network such as the Internet. In this way, the data analyzer 114 communicates with remote databases and remote computing resources to optimize analysis and processing of data.

The data analyzer 114 analyzes heterogeneous data from the databases 104, 106, 108, 110, and 112, and other databases, to make a prediction about at least one business location from the extracted relationships using a spatial grid. It can be appreciated that the data may have homogenous components that are also be analyzed. The methods of the present invention can be encoded in software or hardware used by the data analyzer 114.

The system 100 of the present invention automatically identifies and combines heterogeneous data sources to provide a rank-order list of possible locations in a spatial region. The data analyzer 114 creates and utilizes composite indicators, which are complex mathematical functions of the original input data. The composite indicators may be a function of input data having any of a number of heterogeneous forms. In an alternate embodiment, some of the composite indicators are pre-determined. People or machines may facilitate the pre-determination of a composite indicator. The system 100 employs appropriate dimensionality reduction techniques that are also an aspect of the invention to reduce mathematical burden.

Data Preparation

The databases 104, 106, 108 and 110 include original data sets that can be described in terms of four main types of data. The data types are heterogeneous and include structured data (in the form of tables), unstructured data (in the form of free-text narratives), semi-structured data, and also spatial data.

The data analyzer 114 analyzes each data type separately. It can be appreciated that the data may also be analyzed in combination with some other data set. According to one aspect of the invention the data analyzer 114 creates and utilizes composite indicators to summarize and transform the original data sets. The data analyzer 144 also filters and cleanses the original data sets in order to have the best output. The cleansing process employed by the data analyzer 114 includes removing outliers, identifying bad data that is not within normal bounds, and transforming selected bad data to within normal bounds.

Structured Data

The data analyzer 114 converts structured data into a flat table with rows and columns. Each row corresponds to an observation and each column corresponds to a measured variable. The observations preferably are independent and identically sampled observations from the population, but it can be appreciated that non-independent and non-identically sampled observations can also be converted into useful form.

The data analyzer 114 is configurable to convert observations relating to the demographics of customers in a region of interest (R) into rows on a flat table. The region of interest (R) is a set of connected polygons, but unconnected polygons can represent a region of interest on a map. Customer oriented structured data relevant to R (labeled C) is assumed to contain demographic and summarized purchase data of reasonable resolution. Location oriented structured data is assumed to be arranged where each observation corresponds to a location with the columns corresponding to the attributes of the location. These features can be assigned to a matrix L. Thus, fully structured data from of these types for the region R correspond to two rectangular matrices C and L.

The data analyzer 114 is also configurable to convert observations relating to the Traffic information and other attributes relevant to the locations stored in L so that these can be concatenated with the matrix L. We assume that the customer matrix is of size $(N_c \times p_c)$ and the location matrix is of size $(N_L \times p_L)$, where N corresponds to the number of customers (or locations) and p corresponds to the number of attributes for the customers (or locations). Note that the matrix corresponding to customers can correspond to existing customers, dormant customers, prospective customers, or an arbitrary population relevant to R.

Semi-Structured Data

The data analyzer 114 is configurable to convert semi-structured data into a useable flat table. Preferably, the data analyzer 114 uses XML protocols to handle semi-structured data.

In accordance with one embodiment of the present invention, relevant semi-structured data is coded into a similar flat matrix to C and L above, with the additional restriction that the integrity between semi-structured fields be preserved. Real-estate information, weather, selected traffic elements, and some location attributes are presented in a semi-structured format. The semi-structured location and customer tables are denoted as $S_L$ and $S_C$ respectively with appropriate sizing variables.

Unstructured Data

Unstructured data is available in many forms. News print, Internet textual publications, Internet images, television audio and video streams, satellite broadcasts, and radio broadcasts. In view of the limitations on computing power and network bandwidth, the presently most useful form of unstructured data is in the in the form of free-text narratives such as are available on the Internet, real-estate listings and venues such as Craigslist. These free-text narratives provide a wealth of valuable information. While free-text naratives are clearly recognized as providing a wealth of valuable information, it can be appreciated however, that as computing power and network bandwidth cease to be limitations, that speech and video can be directly utilized, or converted into intermediary form to be indirectly utilized, for the purposes of the present invention.

Given a corpus of $N_d$ documents, each document can be transformed in a vector space representation by creating a matrix of size ($N_d \times p_t$), where $p_t$ equals the number of unique terms in the union of all terms that appear in the $N_d$ documents. An intermediary step may be required for audio and video streams so that the streams are digitized (as necessary), converted into ASCI or other textual representation, and analyzed. The dimensionality of the problem of utilizing free-text narratives is significant and even for relatively short documents, the matrix size may include parameters reflective of $N_d$=30,000 documents, $p_t$=40,000, or greater.

Thus, for customer and location information, assume that two matrices $U_c$ and $U_L$ are created, respectively. These matrices are massive, typically containing $O(10^8)$ elements and can often be handled efficiently with sparse matrix algorithms. The dimensionality of these matrices can be marginally reduced through the process of stemming, stop-word elimination, and elimination of infrequent terms. However, the assignment of a relevancy score to each attribute, and a composite score to each table can significantly aid in dimensionality reduction.

Spatial Data

Spatial data is stored in a spatial database and contains the relevant information about business locations in a 2 or 3 dimensional grid. The gridlines are arbitrary and can be at any resolution. A higher resolution grid yields a higher fidelity system. The data analyzer 114 includes a resource to cleanse, filter and prepare the spatial data, as the other data in the system, in order to generate the best possible predictions. The spatial database should accommodate the computation of relationships such as set oriented, topological, directional, metric, dynamic, and shape-based relationships. The statistical basis of the spatial analysis used in this system is on spatial autocorrelation.

Target Variables

Assuming that the relevant business has an existing set of stores or locations, each store can be assigned a figure of merit that indicates its relative value. For example, revenue, profitability, size, the so-called RFM score (recency, frequency, monetary) score can be assigned to each store. Other figures of merit relevant to business location selection can be chosen. Given the stores can be rank ordered using one of these scores or a combination of these scores (such as revenue/square foot). These scores can be formulated into a table Y, with $N_t$ rows and $p_y$ columns, each column corresponding to one of the above figures of merit.

Assigning a Relevancy Score

The data preparation steps described above can yield massive data sets. According to one embodiment of the invention, the matrices have $O(10^6)$ elements and $O(10^5)$ columns, or more. In order to reduce the dimensionality of the problem, several methods can be employed.

For example, suppose that a new matrix is created which an appropriate composition of (C, L, S). There are several key methods to reduce dimensionality.

Singular Value Decomposition (SVD) of the matrix X=U'DV, (where the ' indicates the transpose operator) reduces dimensionality. In this decomposition, D contains the singular values of the matrix X. We choose the first n components in the orthogonal matrix V and create a projection matrix $P=V_n X$. This creates a low dimensional linear representation of the original matrix X.

Information Gain Formulation: in this formulation IG(y|x)=H(y)−H(y|x), where y is defined as a column in the target matrix Y, and x is a column in the input matrix X. The operator H(q) computes the Shannon entropy of the random variable q: $H(q)=-\int p(x) \log p(x)$, assuming q has density function p. This is an information theoretic quantity often used in the text mining community.

Correlation:

$$corr(y \mid x) = \frac{E(xy) - E(x)E(y)}{\sqrt{E(x^2) - E^2(x)} \sqrt{E(y^2) - E^2(y)}}.$$

Once these relevancy scores are measured for each variable in the table X, the columns in X can be rank ordered in terms of relevance. A pre-specified parameter w can be chosen so that only those columns in X, which have relevance greater than $w_r$ are retained. This typically reduces the dimensionality of the problem significantly, and can be controlled by the single parameter $w_r$. Given a set of tables $X_1, X_2, \ldots, X_k$, each table can be assigned a total relevancy to the prediction problem by taking a possibly weighted sum of the relevancy scores for each variable.

Other Measures of Relevancy

In the past, human experts have dominated the domain of business location selection. Accordingly, it is likely that a business would have experts that have their own opinions about the relative weighting of the attributes in question. Thus, we give them the ability to choose a set of weights w such that the variables are assigned either a relevancy proportional to w'X or w'IG(y|x), or w'corr(y|x).

Convex Combinations

For reasons of interpretability, in the event that expert weights are used, we restrict the weights to be such that w'1=1, w>0 for all elements of w, where 1 is the vector containing unity of appropriate length. This results in a convex combination of attributes, and leads to a simple way to interpret the weights as prior probabilities of the importance of each attribute.

Once the appropriate dimensionality reduction process is complete, we are left with a large input matrix X and an associated target vector (or matrix) Y. Our problem now is to learn the relationships between X (of size N×p) and Y (of size N×m) so that in the region of interest R, we can make predictions. Formally, we have a learning problem to estimate a function F such that $Y \approx F(X, \theta)$, where $\theta$ is a set of parameters corresponding to the coefficients and underlying structure of the model.

Modeling Methods: Gaussian Process Regression

Several methods exist for learning F which corresponds to the best set of attributes that are predictive of an optimal store, as measured by the components of Y. These include a linear model, logistic regression, linear discriminant analysis, neural networks, decision trees, and Gaussian Process Regression. The latter method is preferable for various mathematical reasons described here. There are numerous references to the former methods, and they all suffer from a serious drawback: while they can make predictions, i.e., for a new input value, say $\tilde{X}$, they can emit $\hat{y}=F(\tilde{X},\theta)$, they generally do not directly provide an estimate of the certainty in the prediction. Thus, while a value is emitted, the user is not able to determine with what confidence that information is estimated to be correct. GPR, on the other hand, provides both a prediction and a measure of confidence in that prediction. A brief overview of Gaussian Process Regression is given here.

The Gaussian Process Regression (GPR) technique can be interpreted in a Bayesian context as one where a prior distribution is placed over the space of all possible values of F, such that those functions, which are considered more likely, are given higher weight. The function F is written as $F(x) \sim GP(m(x), k(x, x'))$ with the mean function $m(x)$ generally taken to be zero. The covariance function $k(x,x')$ measures the relationship between two inputs, x and x'. Several covariance (or kernel) functions can be used. For example, we use the squared exponential function $$k(x, x') = \exp\left(\frac{1}{2}|x - x'|^2\right)$$

which emphasizes inputs that are nearby in the input space, and de-emphisizes those that are far away. Once the covariance function is set, predictions can be made using the following governing equations:

$$\hat{y} = k^T(K + \sigma_n^2 I)^{-1} y,$$

$$V(\hat{y}) = k(x,x) - k^T(K + +\sigma_n^2 I)^{-1} k$$

These governing equations give the point estimate for y and the variance of that estimate in a mathematically principled way.

Other Modeling Methods

Support Vector Machines (SVMs) are related to Gaussian Processes and form a second potential method for predicting optimal store locations. The SVM performs regression by projecting the original data into a high, possibly infinite dimensional feature space. In this feature space, a linear model can be fit to the data, with the resulting fit being projected back into the original data space. Numerous studies have shown that this method works well at both regression and classification problems. The standard formulation for the SVM is as follows:

Minimize $\|w\|^2/2$ subject to $$x_i \cdot w + b \geq +1 \text{ for } y_i = +1$$

$$x_i \cdot w + b \leq -1 \text{ for } y_i = -1$$

where $\{(x_i,y_i)|i \in \{1,2,\ldots,n\}\}$ is the set of n training examples where the $x_i$'s are the inputs and each $x_i \in R^d$, $y_i \in \{-1,+1\}$ (i.e., the two possible labels), w is the normal of the separating hyperplane, and b is an intercept term.

Slack variables $\xi_{i, i \in \{1,2,\ldots,n\}}$ are introduced into the optimization problem as follows:

Minimize $$\|w\|^2/2 + C \sum_{i=1}^{n} \xi_i$$

subject to $$x_i \cdot w + b \geq +1 - \xi_i \text{ for } y_i = +1$$

$$x_i \cdot w + b \leq -1 + \xi_i \text{ for } y_i = -1$$

$$\xi_i \geq 0 \forall i$$

C is a parameter chosen by the user which reflects how large a penalty should be assigned to the errors. The slack variable allows for a soft penalty for each example. The data can be mapped to an infinite dimensional space through the use of a kernel operator (as for the Gaussian Process). In this case, we convert the last optimization problem into its Wolfe dual:

Maximize $$\sum_{i=1}^{n} \alpha_i - \frac{1}{2} \sum_{i=1}^{n} \sum_{j=1}^{n} \alpha_i \alpha_j y_i y_j x_i \cdot x_j$$

subject to $$0 \leq \alpha_i \leq C \forall i \in \{1,2,\ldots,n\}$$

$$\sum_{i=1}^{n} \alpha_i y_i = 0.$$

The solution to this problem is $$w = \sum_{i:(x_i,y_i) \in N_s} \alpha_i y_i x_i,$$

where $N_s$ is the set of support vectors. For example the Gaussian kernel, $$K(x_i, x_j) = e^{\frac{-\|x_i - x_j\|}{2\sigma^2}}$$

gives rise to an infinite dimensional space. Neural Networks, Decision Trees, and linear models, and naive Bayes (in the case that the problem can be recast as a classification problem) are other potential method for performing this prediction although they suffer from the problem that they do not generate estimates of the prediction confidence in a principled manner. Because of this and other technical reasons, the GPR method is the preferred choice.

Figure 2A:
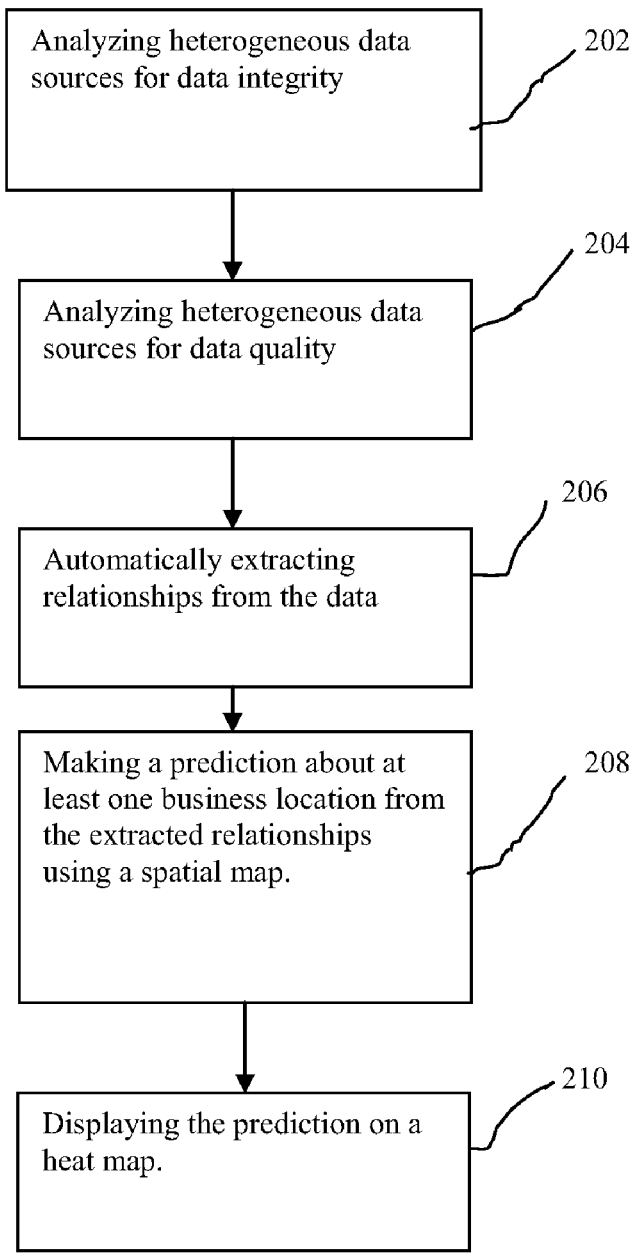
FIG. 2A is a method in accordance with the present invention.

FIG. 2 shows a method 200 of selecting optimal business locations. The method 200 includes the step 202 of analyzing heterogeneous data sources for data integrity, the step 204 of analyzing heterogeneous data sources for data quality, the step 206 of automatically extracting relationships from the data, the step 208 of making a prediction about at least one business location from the extracted relationships using a spatial map, and the step 210 of displaying the prediction on a heat map. It can be appreciated that although the present invention may output prediction using a spatial map, including a spatial map having a spatial grid, or a heat map, the predictions output in accordance with the present invention may be in any human or computer-readable form. For example the predictive output may be tabulated for human viewing, or read directly by a computer for use in broader applications.

The step 206 of automatically extracting relationships generates a composite indicator, which includes more than one indicator that is relevant for selecting an optimal business location. The step of automatically extracting relationships, in accordance with one aspect of the invention includes generating a composite indicator, which correlates projected profitability and at least one other indicator. Preferably the at least one other indicator includes one or more of the following: demographic variables, competitor proximity, accessibility, product mix, and comparable customer spending patterns.

Composite indicators may, for example, include revenue per square foot, sales per unit time, and sales per unit time per age bracket of expected customers. Testing the composite indicators against independent data sets may further verify or determine usefulness of the composite indicator. It can be appreciated that any available data may be used in accordance with the present invention and composite indicators may be pre-determined, or learned from the data that is available.

Location accessibility is an indicator that includes parking availability and proximity to well-traveled roads and freeways. However, there are numerous location accessibility indicators available for use, depending on the data.

Demographic variables include prospective customer gender, age, average income, education level, cultural affiliations and ethnicity, for examples. Census data is one source of demographic data. This is not an exhaustive list.

The location of competitors, parking, square footage, rental rates, lease rates, nearby stores, location of other stores, spending patterns of customers, product mix, product locations, product brands, etc. are all useful indicators. The value of any particular indicator, or composite indicator, depends on the type of business that seeks an optimal location. Likewise, given an available location, such indicators can also be used to determine an optimal business type.

Presenting predictions from numerous heterogeneous data sources can be accomplished on a spreadsheet, but often relationships between important data is lost or not recognized when spreadsheet or other non-user-friendly output is used. According to one aspect of the invention, a prediction about business locations is presented on a spatial map having a spatial grid. According to another aspect of the invention, the special grid includes a heat map overlying the spatial grid to indicate preferred regions on the spatial grid where an optimal business location could be situated. Additionally the prediction may be displayed via a set of points on the spatial grid, each point being representative of a business location. Some of the points can include icons to designate a particularly relevant attribute of a business location.

Numerous ways of analyzing data exist. One way suited to automatically finding relationships from heterogeneous data sources, which can be displayed on a spatial grid includes principal component analysis. Another way of extracting relationships using correlation analysis. Mutual information from heterogeneous data sources can also be relied upon. A discussion of ways to classify entity (business or customer) data, is presented in published U.S. patent application Ser. No. 09/917,409, entitled System and Method for Comparing Populations of Entities, which is incorporated herein by reference.

Machine learning is applied to facilitate the step of analyzing heterogeneous data sources and making predictions. Optimally, the step of creating and using composite indicators includes learning the composite indicators from the data. Useful composite indicators include revenue per square foot, sales per unit time, and sales per unit time per age bracket. Testing the composite indicators assures usefulness.

Heterogeneous data includes structured data fields reflective of demographics including traffic patterns, real estate costs, and competitive business information. Unstructured data may have a textual component, or may be primarily text. For example, newspaper articles referencing a particular region, shopping center or particular location may be useful in formulating a composite indicator relating to popularity, or customer familiarity, for a possible business location.

Data sources may include data tables and the step of analyzing the heterogeneous data sources for integrity includes determining how well one data table relates to another data table. Additionally the step of analyzing data for quality includes determining whether the contents of a data table have been re-characterized over time. Further, the step of analyzing heterogeneous data sources for quality includes cleansing the contents of a data table. These steps assure that data used for predictions is not misleading.

Data normally includes a data source and data elements. The invention includes attributing a relevancy score for each data source, and attributing a relevancy score for each data element. The step of attributing the relevancy of each data element is computed using linear correlation measures. The relevancy score for each data source is calculated to be a weighted sum of scores of each data element in the data source. The step of attributing the relevancy score of each data element is computed using linear correlation measures.

Figure 2B:
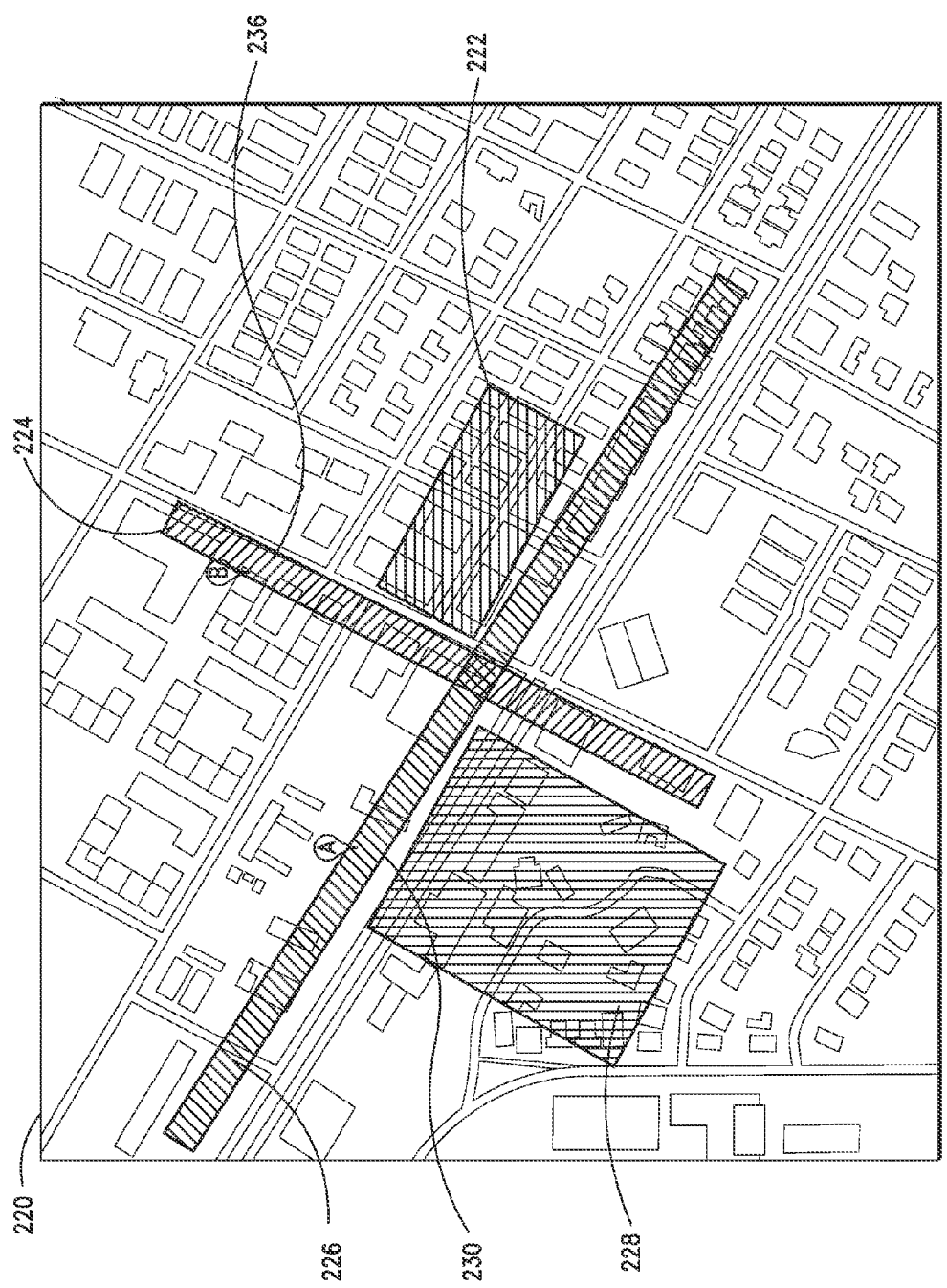
FIG. 2B is a spatial map including a heat map.

FIG. 2B shows a spatial map 220. The spatial map 220 is a hybrid map including a satellite view with street names overlaid on street locations. A variety of colored regions 222, 224, 226, 228 define a set of layered heat maps included on the spatial map 220. The regions 222, 224, 226 and 228 are rectangular, but may assume any form of complex polygon, or curved shape. Regions 224 and 226 are colored red, indicating predicted optimal regions for business locations. The regions 222 and 228 are relatively cooler shades of blue indicating less optimal, but possible, regions predicted for business locations. Special callouts 230 and 236 denote particularly desirable addresses based on the predictive output of the algorithm. The translucence of each region map denotes the degree of certitude that the algorithm has for the prediction. Whether a curve, polygon or other shape is used to indicate preferred regions on a heat map, a rank-ordered list of possible business locations can be superimposed on the spatial map, spatial grid, or heat-map to better facilitate business location decision-making.

Figure 3:
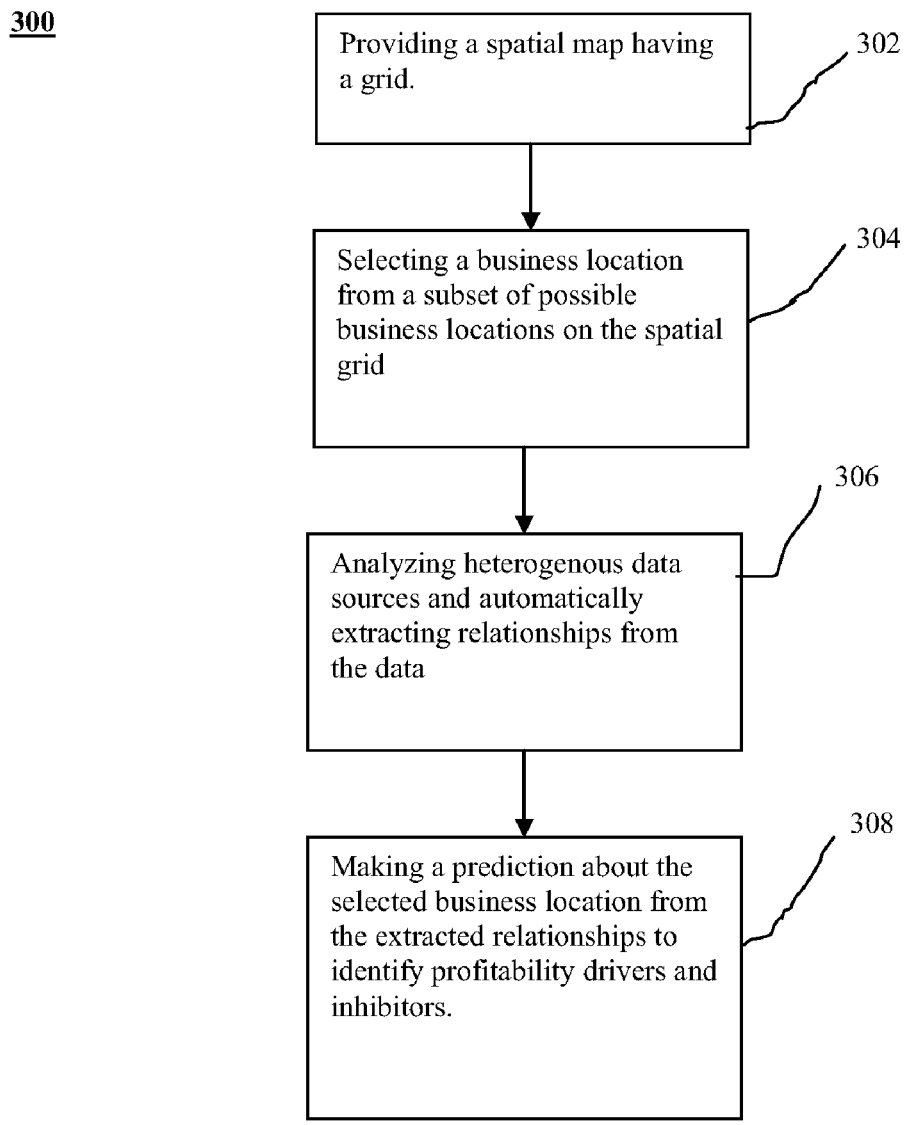
FIG. 3 is a method in accordance with the present invention.

FIG. 3 shows a method 300 of making a prediction about business locations on a spatial grid. The method 300 includes the step 302 of providing a spatial map having grid, the step 304 of selecting a business location from a subset of possible business locations on the spatial grid, the step 306 of analyzing heterogeneous data sources having data, and automatically extracting relationships from the data, and the step 308 of making a prediction about the selected business location from the extracted relationships to identify profitability drivers and inhibitors.

Figure 4:
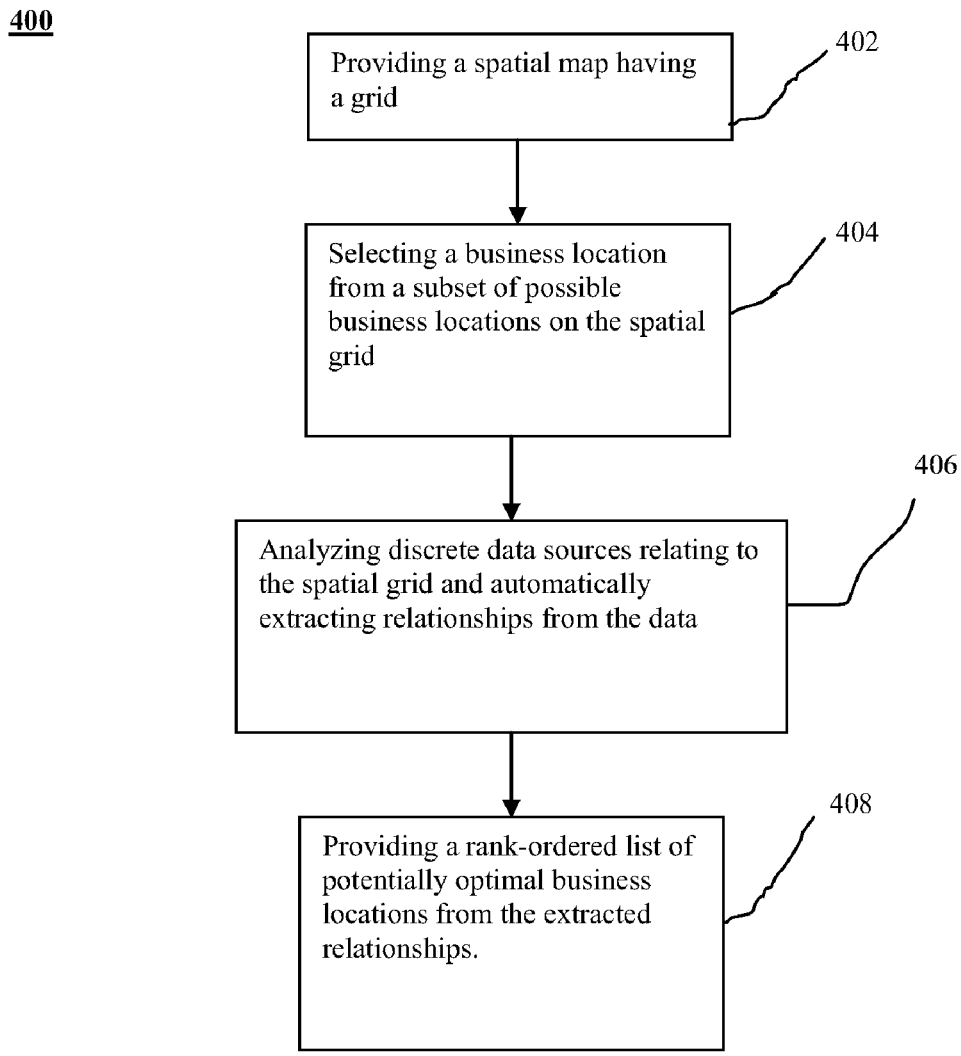
FIG. 4 is a method in accordance with the present invention.

FIG. 4 shows a method 400 of providing rank-ordered list of potentially optimal business locations. The method 400 includes the step 402 of providing a spatial map having a grid, the step 404 of selecting a business location from a subset of possible business locations on the grid, the step 406 of analyzing heterogeneous data sources relating to the grid and automatically extracting relationships from the data, and the step 408 of providing a rank-ordered list of potentially optimal business locations from the extracted relationships.

While the present invention is disclosed in terms of exemplary embodiments, it can be appreciated that the methods of the present invention can be practiced in a number of ways as defined by the scope of the appended claims. Additionally various features of the system of the present invention can be modified in a myriad of ways to achieve the goals of the invention, which include making a prediction about at least one business location from the extracted relationships using a spatial grid.

The invention claimed is:

1. A method for identifying profitability drivers for a business, comprising the steps of:
   providing a display interface for displaying a spatial map;
   analyzing heterogeneous data having a spatial component to find utilizable data, wherein one or more databases hold the heterogeneous data;
   extracting composite indicators from the utilizable data;
   making a prediction using the composite indicators about at least one profitability driver for at least one business location; and presenting the prediction on the display interface in the form of a spatial map.

2. A method as set forth in claim 1, further comprising:
   presenting the prediction in the form of a rank-ordered list of profitability drivers and profitability inhibitors.

3. A method as set forth in claim 1, further comprising:
   presenting a heat-map to display regions having optimal profitability drivers.

4. A method as set forth in claim 3, wherein presenting a heat-map includes displaying polygons of various colors.

5. A method for making and displaying predictions about business locations, comprising the steps of:
   providing a hardware display interface for displaying a spatial map;
   analyzing heterogeneous data having a spatial component to find utilizable data, wherein one or more databases hold the heterogeneous data;
   extracting relationships from the utilizable data;
   using the extracted relationships to make a prediction about at least one business location; and
   presenting the prediction with the display hardware on the spatial map.

6. A method as set forth in claim 5, further comprising:
   presenting the prediction in the form of a rank-ordered list on the spatial map.

7. A method as set forth in claim 5, wherein the spatial map includes a heat map.

8. A method as set forth in claim 7, wherein the step of presenting includes displaying polygons of various colors.

9. A method as set forth in claim 5, wherein the step of automatically extracting relationships includes generating a composite indicator.

10. A method as set forth in claim 9, wherein the composite indicator correlates spatial data with unstructured data and structured data.

11. A method as set forth in claim 5, wherein the composite indicator correlates the spatial data with at least one indicator derived from the group consisting essentially of: demographic variables, competitor proximity, accessibility, product mix, and comparable customer spending patterns.

12. A method as set forth in claim 5, wherein the step of analyzing includes creating a data matrix having a particular dimensionality and the method further comprises the step of reducing the dimensionality of the data matrix.

13. A method as set forth in claim 5, wherein the step of analyzing includes creating a data matrix having a particular dimensionality and the method further comprises the step of reducing the dimensionality of the data matrix by assigning relevancy scores to the data, selecting meaningful data based on the relevancy score and utilizing only the meaningful data.

14. A method as set forth in claim 5, wherein the step of automatically extracting relationships includes extracting relationships using correlation analysis.

* * * * *